(12) United States Patent  
Nyce (10) Patent No.: US 6,501,263 B1  
(45) Date of Patent: Dec. 31, 2002

(54) ROTARY POSITION SENSOR

(75) Inventor: David S. Nyce, Apex, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/531,573

(22) Filed: Mar. 21, 2000

Related U.S. Application Data (63) Continuation-in-part of application No. 09/340,387, filed on Jun. 28, 1999, now Pat. No. 6,426,618, which is a continuation-in-part of application No. 08/828,193, filed on Mar. 21, 1997, now Pat. No. 5,952,823.
(60) Provisional application No. 60/013,985, filed on Mar. 22, 1996.

(51) Int. Cl.$^7$ ................................................. G01B 7/14
(52) U.S. Cl. .............................. 324/207.13; 324/207.25
(58) Field of Search ...................... 324/207.13, 207.24, 324/207.25, 235; 367/117

(56) References Cited

U.S. PATENT DOCUMENTS 5,818,038 A * 10/1998 Kerkmann et al. .... 250/231.13

* cited by examiner

Primary Examiner—Walter E. Snow  
(74) Attorney, Agent, or Firm—David M. Ostfeld

(57) ABSTRACT

A steering angle sensing system 1, 26 for measuring the angle position of a vehicle steering wheel is disclosed which uses at least one position magnet 7, 8, G1, G2, G3 coupled to the rotary movement of the steering wheel 2' as a transducer, and a magnetostrictive transducer 4, 35 as a measuring device and a second measuring device 70, 90 for measuring the angular movement of the vehicle wheels. Magnetostrictive transducer 4, 35 includes an elongated, magnetostrictive waveguide 9, 33 extending over a defined arc section, with mode converter 10, 35 for detecting magnetostrictively generated voltage pulses at one end. The waveguide 9, 33 is stationary related to the rotary movement of at least one position magnet 7, 8, G1, G2, G3 so that, when turning the steering wheel 2', the magnet field of one position magnet 7, 8, G1, G2, G3 is applied to waveguide 9, 33 in different positions dependent of the position of the steering wheel 2'. The second measuring device 70, 90 may measure gross changes to distinguish 360° or less, for example 270°, rotation whereas the steering wheel measuring device 1, 26 measures fine changes of the vehicle steering wheel 2'.

13 Claims, 7 Drawing Sheets

ROTARY POSITION SENSOR

CROSS REFERENCE TO RELATED APPLICATIONS

This application is a continuation in part of U.S. application Ser. No. 09/340,387, filed Jun. 28, 1999, now U.S. Pat. No. 6,426,618 which is a continuation in part of U.S. application Ser. No. 08/828,193, filed Mar. 21, 1997, now U.S. Pat. No. 5,952,823 which claims the benefit of U.S. Provisional Application No. 60/013,985, entitled "Magnetostrictive Linear Displacement Transducer for a Shock Absorber," filed Mar. 22, 1996.

BACKGROUND OF THE INVENTION

1. Field of the Invention

The present invention relates to a sensor to measure the angular position of a steering system. More particularly, the present invention relates to magnetostrictive linear displacement and other transducers for use with a steering wheel to measure the angular position of the steering wheel.

2. Background Art

Various devices have been advanced to measure the distance traveled by a device in a vehicle. One common application is determining the movement of the piston in a hydraulic, pneumatic, or hydro-pneumatic component of the vehicle, such as a strut suspension, where the piston moves axially in a cylinder filled with at least one damping medium. See U.S. Pat. Nos. 4,502,006; 4,638,670; and 5,233,293, each of which discloses a displacement sensor to perform this function.

Measuring the angle position of a car steering wheel is required for many purposes, such as traveling dynamic system, or for automatic electronic reset of a driving direction indicator after traveling through curves. An opto-electronically operating position sensing system for this steering angle determination is described in DE 40 22 837 A1. The steering angle sensing system described in DE 40 22 837 A1 consists of two elements arranged in parallel separated by a distance—a light source and a sensor line—as well as a code disk built as a transducer arranged between the light source and the sensor line, and coupled to the movement of the steering shaft. The light source and sensor line are stationary related to the transducer disk. The transducer disk is a light-slot disk and has, as a scanning track, a spiral with increasing diameter from the center towards the outer periphery. Dependent on steering angle movement, different pixels of the sensor line are lit by different areas of the scanning track. Dependent of which pixels or pixel clusters are lit in a defined steering wheel position, the steering angle is determined within a circle of 360° or less, for example 270°, and requires counting revolutions beyond such amount.

The measuring accuracy of such an opto-electronic steering angle sensing system is determined by accuracy and fineness of the scanning tracks of the transducer disk and by projection sharpness of the light tracks on the photo-sensitive surface of the sensor line. If high accuracies are required, light-slot disks of very complicated structure must be provided. With this type of opto-electronic steering angle sensing system, there is also a risk of contamination of the very fine light slots and of the photo-sensitive surface of the sensor line so that steering angle measurement could be affected negatively.

An object of the present invention is to have a contactlessly operating steering angle sensing system for measuring the angle position of a car steering wheel, which is insensitive to contamination and does not require counting of the wheel revolutions to determine the absolute wheel position avoiding the problem in the prior art of regaining a lost count.

BRIEF SUMMARY OF THE INVENTION

A vehicle steering angle sensing system is disclosed for detecting the angle position of an automotive steering wheel. It comprises a transducer coupled to the rotary movement of the steering wheel and a measuring device. The measuring device is stationary referred to the transducer rotary movement, for measurement of transducer signals. Thus, the measuring device and transducer are arranged so that the transducer signals detected by the measuring device represent the relative position between steering wheel and measuring device.

In the invention, the contactless operating steering angle sensing system couples at least one position magnet as a sensor of the rotary movement of the steering wheel, and by providing an elongated magnetostrictive waveguide extending over a defined arc sector with a mode converter mounted at one end of the waveguide forms a magnetostrictive transducer. The magnet field of the position magnet acts on different positions of the waveguide dependent upon the steering wheel position.

The signals generated from the position magnet in response to a pulse on the waveguide act on the waveguide when using such a device as a measure device. Steering angle measurement is obtained this way even in the presence of contamination of the detecting or measuring device.

Beside the primary rotary sensor which is capable of measuring an angle of 360° or less, for example 270°, and is mounted to measure the steering wheel position, a secondary position sensor is used to measure the actual vehicle wheel steered position to provide an absolute multiple revolution sensing system that does not require counting of the revolutions of the steering wheel. The accuracy of the primary sensor is sufficient to provide the desired accuracy of data needed for steering function requirement, while the secondary sensor accuracy is only sufficient to indicate which revolution of the primary sensor is being measured.

BRIEF DESCRIPTION OF THE DRAWINGS

For a further understanding of the nature and objects of the present invention, reference should be made to the drawings in which like parts are given like reference numbers and wherein.

DETAILED DESCRIPTION OF THE PREFERRED EMBODIMENTS

Figure 1:
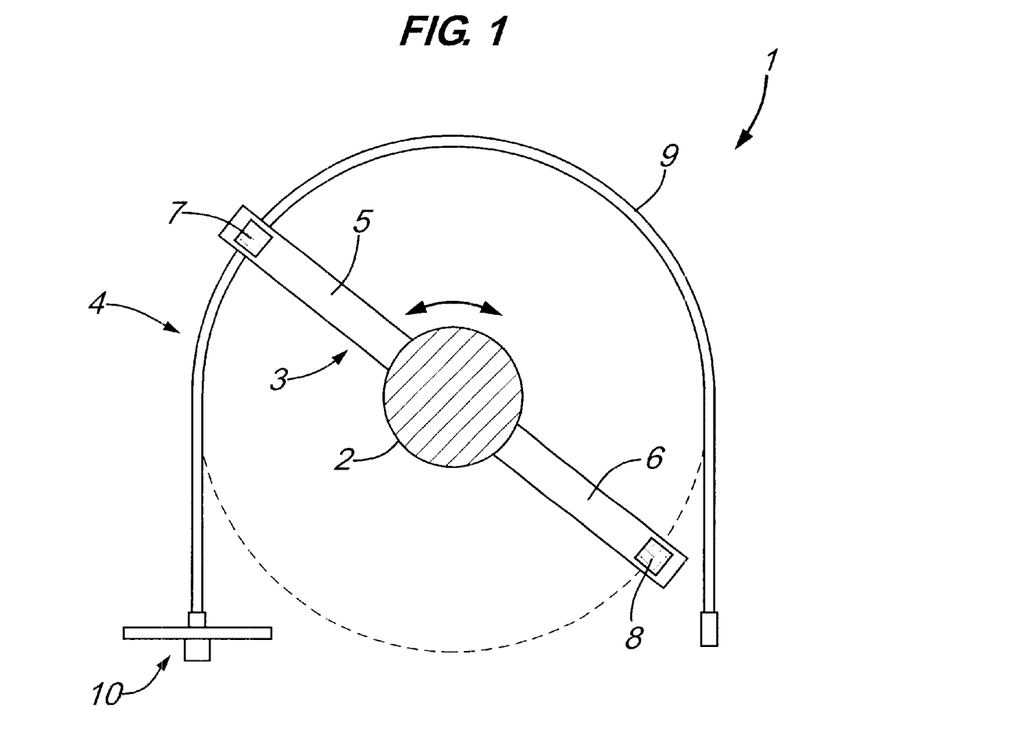
FIG. 1 is a schematic drawing of a top view of a first embodiment of the magnetostrictive steering angle sensing system of the present invention.

The first embodiment of the primary rotary sensor of the steering angle sensing system of the present invention is shown in FIG. 1. The system comprises a position magnet support 3 firmly fitted to a steering shaft 2, and a magnetostrictive transducer 4. Position magnet support 3 carries a first position magnet 7 and a second position magnet 8, mounted on the corresponding ends of the corresponding two position magnet support arms 5, 6 of position magnet support 3. In the embodiment shown in FIG. 1, position magnets 7, 8 are mounted with opposite acting magnetic flux lines, so that the North magnetic pole of first position magnet 7 and the South magnetic pole of second position magnet 8 are directed towards a waveguide 9 of magnetostrictive transducer 4. Thus, each of the position magnets 7, 8 are identified by the proper signal value for a mode converter 10 of transducer 4.

While no cross-sectional view is shown of the position magnets 7, 8 of FIG. 1, the side of each of the position magnets 7, 8 of FIG. 1 facing waveguide 9 is substantially flush with the underside surface of the arms 5, 6 of position magnet support 3.

Magnetostrictive transducer 4 further includes the waveguide 9 with the mode converter 10 mounted at one end. Waveguide 9 is fixed with reference to rotation of steering shaft 2 or position magnet support 3 in a semicircle with equal radius. The radius of the arc traced by waveguide 9 corresponds to the radius at which the position magnets 7, 8 are moved when turning steering shaft 2 by wheel 2' connected to shaft 2.

Waveguide 9 comprises a waveguide of an electrical internal conductor of magnetostrictive material and a magnetically neutral electrical return conductor (not shown but well known in the art). Each position magnet 7, 8 is purposefully mounted with reference to the waveguide 9 so that one of its poles is directed towards the outer surface of the waveguide 9 as discussed above. Dependent of the steering wheel 2 angle position, the magnet field of these magnets 7, 8 act on various points of the waveguide 9. Thus, one end of the waveguide 9 is fitted with a mode converter 10, which is designed for receiving a magnetostrictive triggered pulse representing a permeability change of the coil armature of the mode converter 10 and transported through the waveguide 9 as a sound wave conducted through a solid body. With current pulses applied to the waveguide 9, such a pulse is generated by the electric field emanating from the waveguide 9 at the point in which the field lines of the position magnets 7, 8 are induced into the waveguide 9. The voltage pulse travel time from the place of its generation (which is the position of the position magnet 7, 8) to the mode converter 10 is used as a measure for determining the location of the position magnet 7, 8 and thus as a measure for the steering column 2, and thus steering wheel, angle position. Not shown are control and evaluating electronics assigned to mode converter and the electrical wire for waveguide 9.

In FIG. 1, the waveguide 9 is bent over a defined arc section around the steering shaft 2 with the position magnets 7, 8 at a distance from waveguide 9 so that the waveguide 9 is coupled to the position magnets 7, 8 for the rotary movement of the steering shaft 2. Dependent on the design of the mode converter 10, such a waveguide 9 can extend around arc sections smaller than 360° or less, for example 270°, which can be for instance 180° as in FIG. 1. If a waveguide 9 extending around an arc section smaller than 360° or less, for example 270°, is provided, measuring the steering wheel shaft 2 position in a range of 360° or less, for example 270°, requires assignment of at least a sufficient number of position magnets 7, 8 to the waveguide 9 for inducing the magnet field of at least one position magnet into the waveguide in each steering wheel position. For distinction purposes, the transducer magnets can have different codes such as polarity or different angular separations (FIG. 5) for the position magnets 7, 8.

Figure 1A:
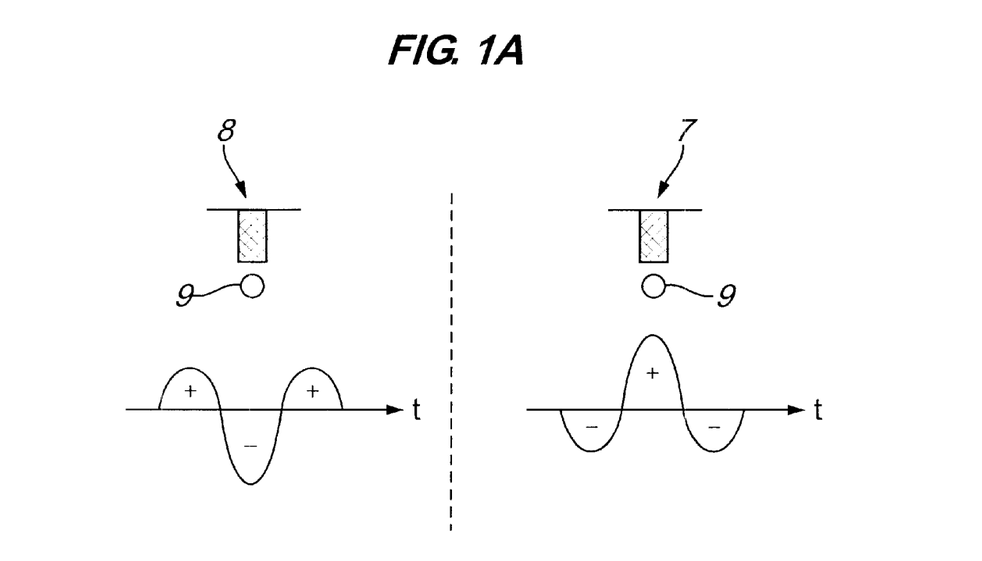
FIG. 1a is an illustration of measurable pulse curves with differently configured position magnets.

For these measurements, the current pulse is applied to the waveguide 9 at a pre-defined clock and which for measuring the steering angle, determines the travel time of the voltage pulses received by mode converter 10 dependent on the position of position magnets 7, 8 acting on waveguide 9, and the pulse curve. The embodiment in FIG. 1 shows that waveguide 9 under the influence of the magnetic field of at least one position magnet 7, 8 in every position of the steering wheel or of steering shaft 2. The different arrangement of the two position magnets 7,8, as to their polarity, to waveguide 9 causes a different pulse curve dependent on position magnets 7, 8 acting on waveguide 9. These pulses may be characterized by different polarities of their curves, as shown in FIG. 1a. For instance, the measurable pulse curve when applied to waveguide 9 by second position magnet 8 is characterized by a positive pre and post oscillation with a negative main oscillation, while the pulse curve when applied to waveguide 9 by first position magnet 7 is in reverse polarity and thus characterized by negative pre and post oscillation and positive main oscillation. Such an arrangement permits measurement of steering angles within 360° or less, for example 270°.

Figure 2:
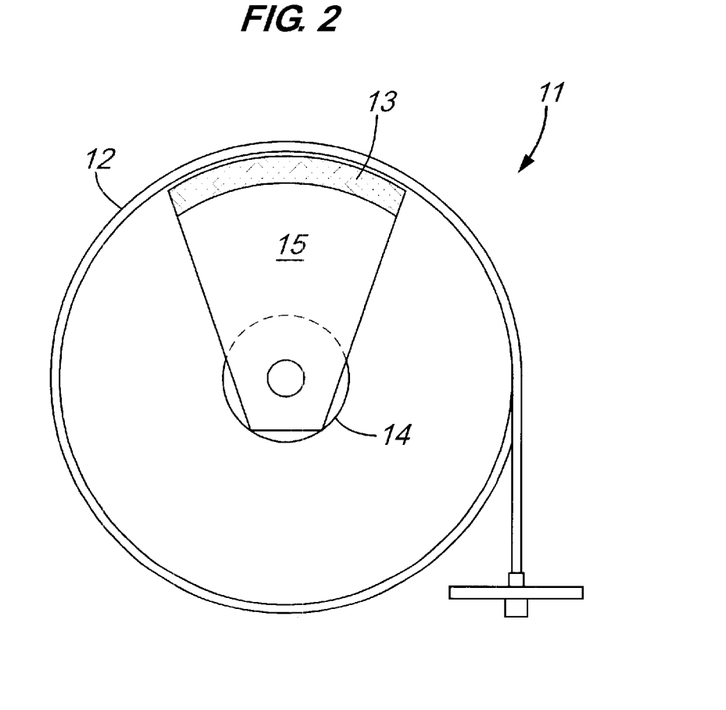
FIG. 2 is a schematic drawing corresponding to a top view of a second embodiment of a magnetostrictive steering angle sensing system of the present invention.
Figure 3:
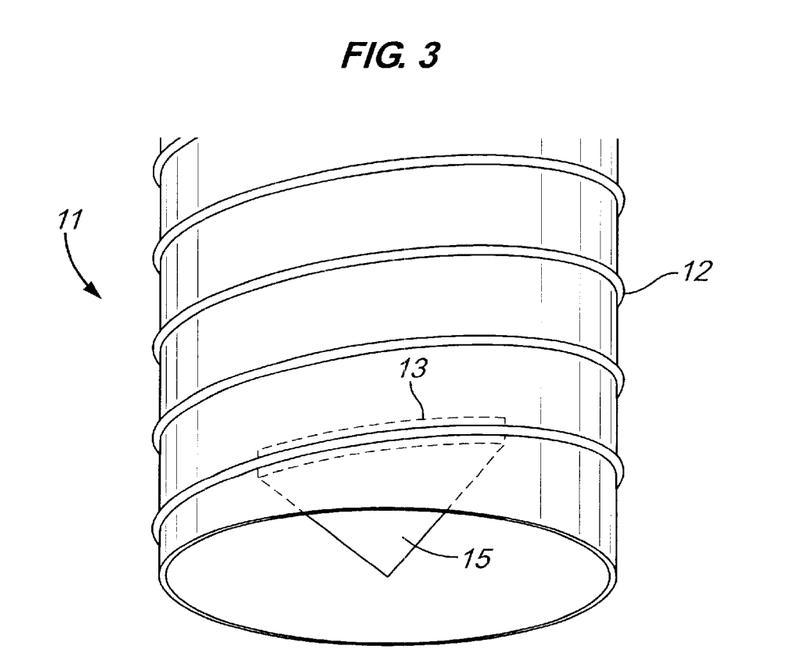
FIG. 3 is a schematic side view, partly in phantom line, of the magnetostrictive steering angle sensing system shown in FIG. 2.
Figure 4:
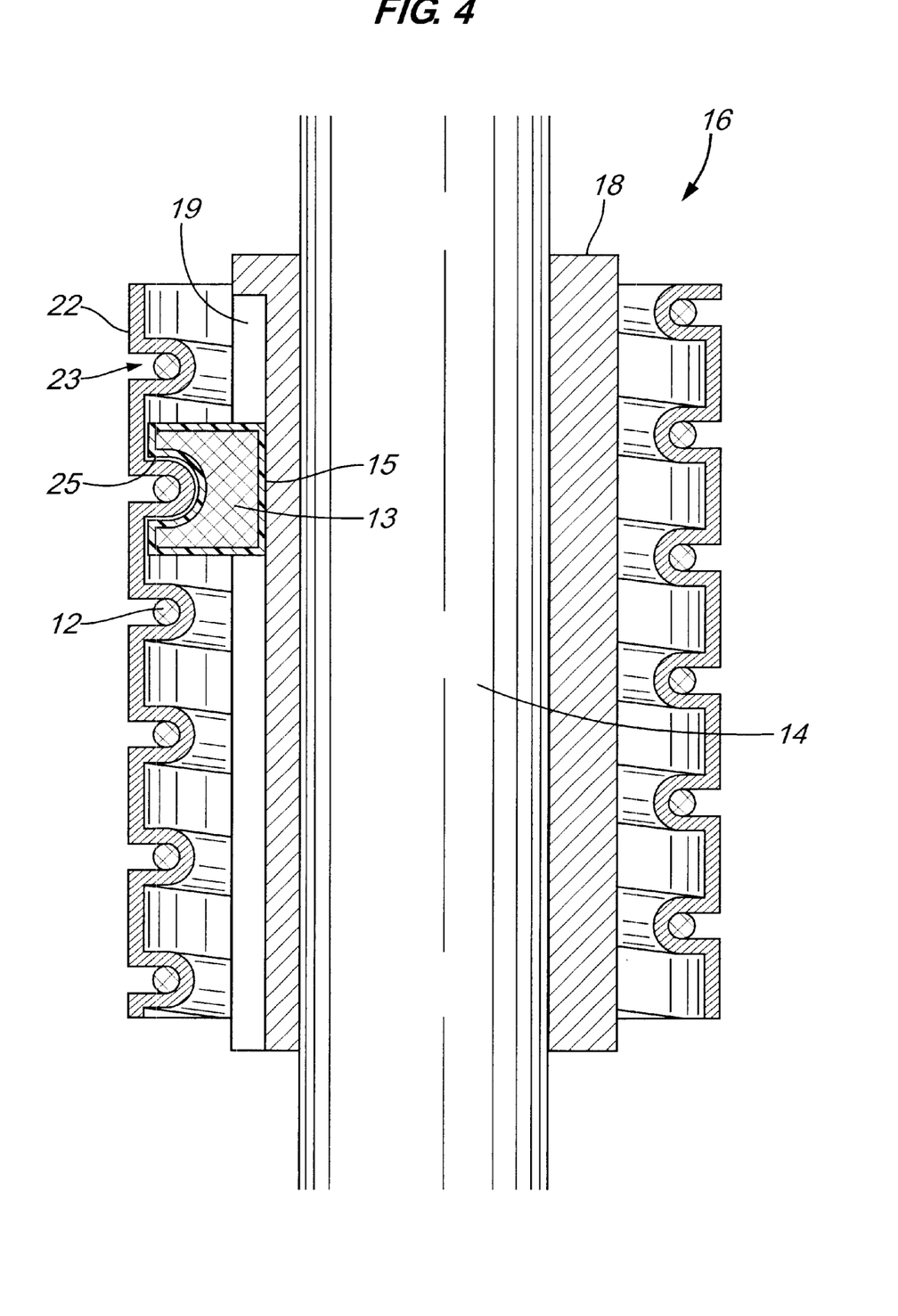
FIG. 4 is a schematic, axial representation of a magnetostrictive steering angle sensor arrangement, appropriate for FIGS. 2 and 3.

In another embodiment of the primary sensor shown in FIG. 2, FIG. 3, and FIG. 4, a magnetostrictive steering angle sensing system 11 for angles greater than 360° or less, for example 270°, is shown. Waveguide 12 is arranged spirally, whereby the number of turns of waveguide 12 corresponds to the number of possible steering wheel revolutions as measured by revolutions of steering column or shaft 14. The position magnet is a single position magnet 13 which is mounted at the end of a position magnet support arm 15 fitted to mesh with the waveguide 12 mounted on steering shaft 14. Position magnet 13 is thus guided along the inside of waveguide 12. With the steering wheel positioned for driving straight ahead, i.e. in zero position of steering shaft 14, position magnet 13 is approximately in the middle of the waveguide 12 length. When moving the steering wheel in one or another direction, this steering angle sensing system 11 can measure steering angles also over several revolutions, and the position magnet 13 follows the waveguide 12. For guiding position magnet 13 along the sloped spiral inside waveguide 12 when turning the steering shaft 14, waveguide 12 would be arranged on a steering shaft 14, such as by spindle shell 18 located on steering shaft 14, so that the magnet 13 is moved in the axial direction towards the steering wheel or away from the steering wheel, dependent of steering direction when turning the steering wheel. For example, in FIG. 4, through a mechanical coupling, the rotation of the steering shaft 14 or spindle 18 is converted to a translatory movement of the transmitter magnet 13. The waveguide 12 can be attached in a straight or spiral fashion and arc to be arranged opposite of the path of motion of the transmitter's magnet 13. Arrangement of position magnet support arm 15 so that it follows the slope of a stationary waveguide 12 corresponding to waveguide 12 of FIG. 2 when turning the steering wheel is thus provided. Thus, for measuring a vehicle steering wheel angle position exceeding 360° or less, for example 270°, using the steering angle sensing system of the present invention, a magnetostrictive arc waveguide 12 section, extending spirally over several 360° or less, for example 270°, circles may be employed as shown in FIG. 3 and FIG. 4, whereby the number of spirals correspond to the number of possible steering wheel revolutions. In this case, one or several position magnets 13 are rotated internally juxtaposed to the magnetostrictive waveguide 12 spirals. To ensure that the position magnets 13 follow the spiral slope when turning the steering wheel, the shell or frame 18 is provided on which the spiral-shaped waveguide 12 is mounted on the shell or frame 18 associated with the steering shaft 14 so the waveguide 12 is mounted around the longitudinal axis of the steering shaft 14 when turning the steering wheel.

The position magnet 13 can be mounted on support arms, rings or even disks coupled to the steering shaft 2, 14 so that they are turned with the steering shaft 14. The magnetic areas can be provided on these elements by magnetizing or by arranging individual magnets accordingly.

FIG. 4 shows the arrangement 16, whose construction is a more specific illustration to that of steering angle sensor arrangement 11, as shown in FIG. 2 and FIG. 3. In a section of the steering column 14, a tightenly coupled shell 18 is affixed. The shell 18 has a longitudinal slot 19, in which a position magnet 13 is integrated into the outer facing surface of a magnet support arm 15.

The shell 18 is made up of two parts (not shown), so that these shell 18 additions to the steering column 14 can be easily linked around and coupled to the steering column 14. The tightened coupling is made between steering column 14 and shell 18 by using, for example, an entrained brad (not shown). The shell 18 may be coated with a shaped plastic coating 22 on the exterior surface of shell 18, in which a single spiral-shaped groove 23 is formed around the steering column 14. A magnetostrictive waveguide 12 is arranged in groove 23.

The side of the magnet support arm 15 which is facing outward from steering column 14 may have a plastic covering 21 in which is mounted or integrated magnet 13. Magnet 13 and covering 21 are formed to a groove 25 slightly larger in diameter than groove 23 and mounted around so that groove 25 surrounds groove 23 on three sides of the portion of groove 23 supporting waveguide 12. It is preferable that the groove 23 is slightly undercut, so that the magnet support arm 15, or more precisely the magnet 13, is held in place with a minimal initial tension (stress) on the groove 23 walls. This results in the possibility of a backlash-free coupling between the magnet 13 and the groove 23, and thus waveguide 12 contained therein. With a turn of the steering column 14, the magnet support arm 15, which is held by friction or otherwise affixed to column 14 to follow groove 23 in the longitudinal slot 19, will move in a pattern parallel to the longitudinal axis of the steering column 14. This will allow the groove 23 to slide in the groove 25, so that, at all times, the magnet 13 is arranged in relation to the spiral-shaped groove 23 (and the waveguide 12 which it contains) according to the rotational position and rotary motion of the steering column 14. With this, it is possible to make a steering angle sensor arrangement with very high spatial resolution and therefore a very exact angle intercept. No secondary sensor is then needed.

If very high spatial resolution is not needed, it is possible that the position magnet 13 in the longitudinal slot 19 of the shell 18 is simply translationally movable and that the magnetostrictive transmitter wire 12 is arranged parallel (not shown) to the movement of the position magnet 13.

The intensity of the voltage pulse rather than the travel time is not usually reliable in measurement because the voltage amplitude is not precise as timing is in response to factors such as noise, temperature, manufacturing variance, and the like. Other characteristics might be used for measurement as well, such as the magnetic field supported by the waveguide.

Figure 5:
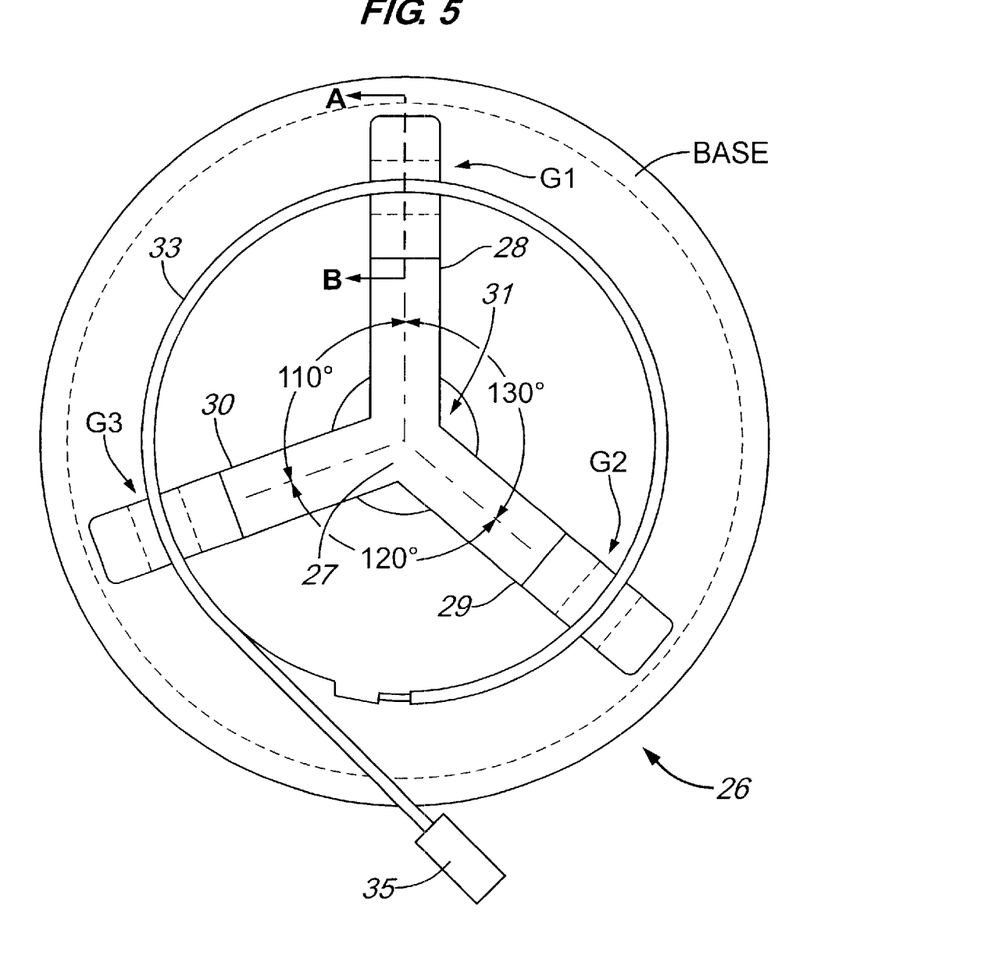
FIG. 5 is schematic drawing corresponding to a top view of a third embodiment of the magnetostrictive steering angle sensing system of the present invention.
Figure 6:
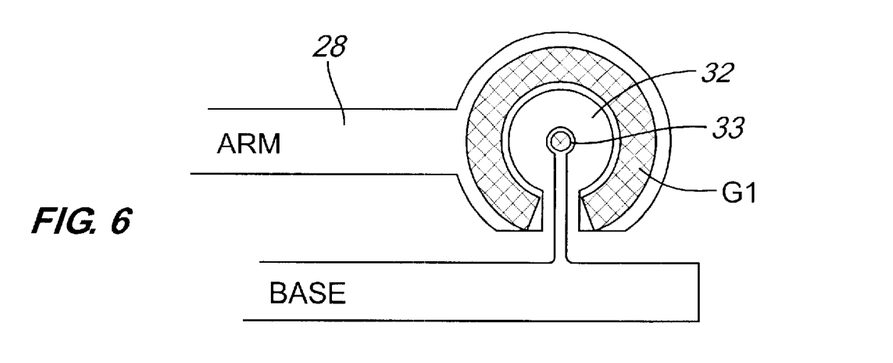
FIG. 6 is a cross-sectional view of FIG. 4 taken along section lines A–B of FIG. 5.

For another method of utilizing a primary sensor measuring at least 360°, see FIG. 5 and FIG. 6. FIG. 5 and FIG. 6 show the use of three magnets spaced over 360° rather than two magnets spaced over 180° as in FIG. 1. As shown in FIG. 5, position magnet support arms 28, 29, 30 are mounted on steering shaft 31 with varying angular displacements between centerlines of the magnet support arms 28, 29, 30. For example, the angular displacement between the centerlines of position magnet support arms 28, 30 is shown as 110°, while the displacement between position magnet support arms 28, 29 is shown as 130° and the angular displacement between the centerlines of position magnet support arms 29, 30 is shown as 120°. Position magnets G1, G2, G3 are mounted at the ends of position magnet support arms 28, 29, 30, respectively. Thus, there is an improvement of having three magnets 28, 29, 30 from the standpoint of always being able to read two magnets at the same time and by their different angular separation to know which magnets are being read for purposes of determining how many turns have been made by the steering wheel 2' through the steering shaft 31. The same spacing also works in some instances for two position magnets, thus showing the orientation of the position magnets without having to have a change in polarity, i.e., having the two position magnets have an angular separation, for example, similar to that shown in FIG. 1, but wherein the angular displacement between the centerlines of support arms 5,6 would be less than 180° on one side and more than 180° on the other side. Such separation may be superior to having alternate polarities because the detection circuitry is usually different depending on the polarity of the pulse.

In FIG. 5, as in FIG. 1, there is included a waveguide 33 arcuately mounted in fixed relation with steering shaft 31 by mounting 34 (FIG. 6), having at one end a sensor head 35 from which the pulse is originated for the waveguide 33 and which also includes the mode convertor (not shown separately but part of sensor head 35) for sensing the response from the magnetic fields induced by position magnets G1, G2, G3, or some combination of them, onto the waveguide 33. As shown in FIG. 6, the position magnets, such as position magnet G1, instead of being suspended over the waveguide 33, as in FIG. 1, FIG. 3 and FIG. 4, more nearly surround waveguide 33 which improves the signal along waveguide 33. An opening 55 is also allocated to permit the sensor magnet G1 to disengage during its rotation along the waveguide 33 to prevent the position magnets G1, G2, G3 from approaching too close to sensor head 35. There is a distance from the sensor head 35 over which the magnetostrictive transducer does not operate.

The methods for measuring 360° and under in FIG. 1 and FIG. 5 are as follows:

In FIG. 1, position magnets 7, 8 have opposite polarities facing the waveguide 9, for example North and South, respectively. Detection circuitry measures the "pulse time" between the waveguide interrogation pulse and the first received signal pulse due to a position magnet 7, 8. The detection circuitry also indicates whether the received signal pulse was generated by position magnet 7 or position magnet 8, by the polarity of the signal pulse. The measured pulse time represents a zero to 180° degrees rotation. This is the measurement result if the signal pulse was due to position magnet 7. If the signal pulse was due to position magnet 8, then 180° is added to the measured rotation, and this sum becomes the measurement result.

Alternatively, position magnets 7, 8 may be identified by field strength or angular position with respect to each other, instead of using opposite polarities.

In FIG. 5, position magnets G1, G2, G3 are separated by varying angles, for example 110°, 120°, and 130°, respectively. Position magnets, G1, G2, G3 are mounted at fixed but not equal angles from each other, it is possible to avoid responses to extraneous magnets that may exist in the environment in which the device is mounted. These specific angles enable identification of the pulses and additionally serve to allow pulses separated by other angles to be ignored. Detection circuitry measures the "pulse time" between the waveguide interrogation pulse and each of the first two received signal pulses due to position magnets G1, G2, G3. These two pulse times can be called "pulse times one" and "pulse times two." The difference between the two pulse times represents the identity of the magnets for example position magnets G1, G2, respectively. Pulse time one represents the measured rotation of from zero to approximately 120° degrees. This is the measurement result if pulse time one was due to position magnet G3. If pulse time one was due to position magnet G2, then 120° degrees is added to the measured rotation and this sum becomes the measurement result. If pulse time one was due to position magnet G1, then 250° degrees is added to the measured rotation and this sum becomes the measurement result.

As shown in FIG. 5, a damp 40 is provided at the other end of the waveguide 33 to dampen reflections of the pulse and further give accuracy to the invention.

For measurements above 360° or less, for example 270°, the methods used for under 360° may be continued with a counter that counts the number of rotations for which the 360° or less, for example 270°, mark has been passed. Thus, for the approximate two and a half turns that a steering wheel may have, the internal counter may be utilized with either device of FIG. 1 or FIG. 5 to count above 360° or less, for example 270°. However, if there is a power failure, there is difficulty in reinitializing the device counter because there is no absolute way to detect the wheel position immediately after the failure.

Figure 7:
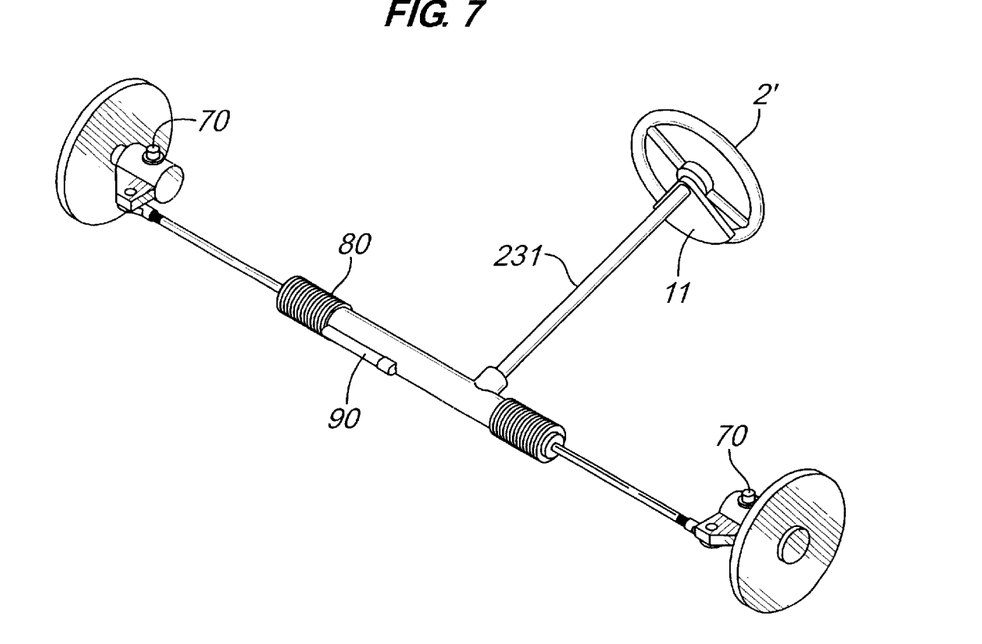
FIG. 7 is a drawing of a vehicle steering system showing the location of the primary rotary sensor and alternate positions of the secondary sensor, as either one of the angle rotary sensors shown in FIG. 8 or a linear sensor shown in FIG. 9.
Figure 8:
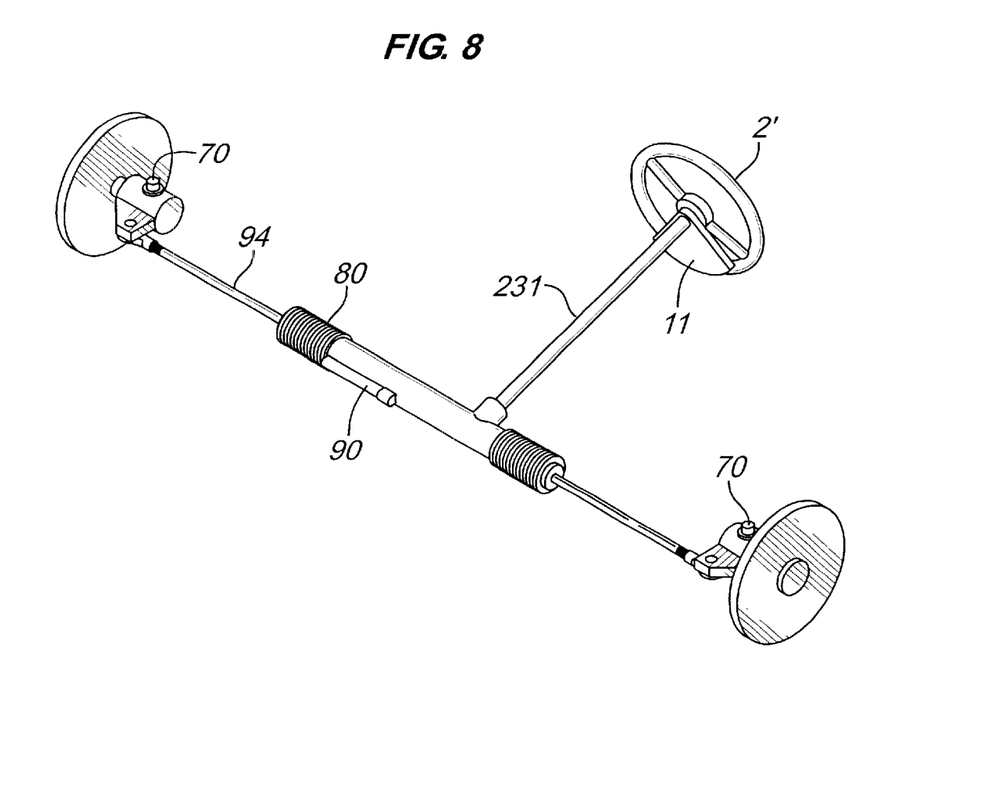
FIG. 8 is a drawing of the vehicle steering system showing one alternate embodiment of the secondary sensor is an angle rotary sensor detecting orientation of the wheel.

As a first alternate preferred embodiment, as shown in FIGS. 7 and 8, a steering angular rotary sensor 70 may be connected with the steering gear system 80 to measure the actual position of the wheels as a result of action of the steering wheel shaft 2, 31 acting on steering gear system 80. Steering angle rotary sensor 70 may be mounted on either wheel or for redundancy on both wheels. Because sensor 70 is very coarse in measurement and only needs to measure passages of 360° or less, for example 270°, of steering wheels 2', contact switches may be used to indicate the current arc through which the steering wheel 2' has passed from straight alignment.

Figure 9:
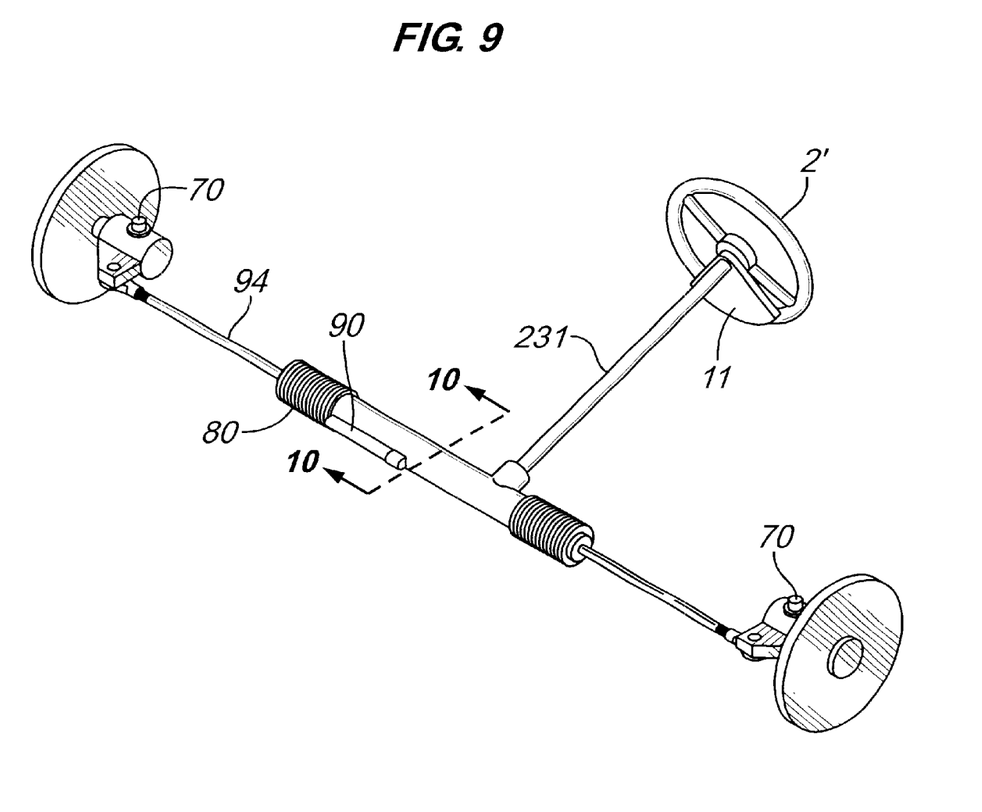
FIG. 9 is a drawing of the vehicle steering system showing another alternate embodiment of the secondary sensor is a linear sensor of the steering gear system, such as an Auto SE™ mounted on the steering gear and showing shaft deflection with the magnet.
Figure 10:
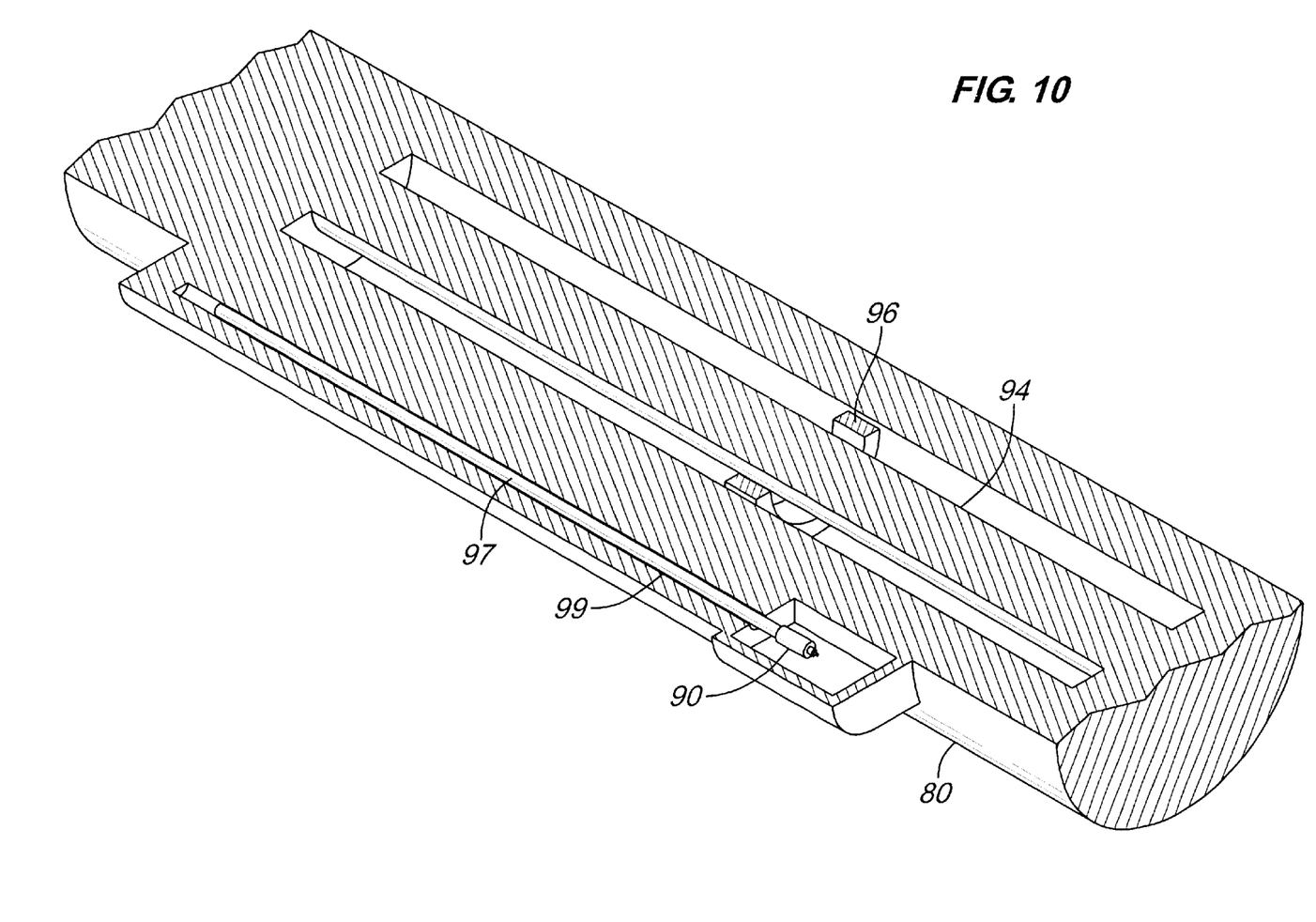
FIG. 10 is a detail of FIG. 9, in cross-section along section lines 10—10 of FIG. 9.

Further, as a second alternate, preferred embodiment, alternatively to using a steering angular rotary sensor 70 or using an internal counter, a steering angle linear position sensor 90 may be used as shown in FIGS. 7 and 9. As shown in FIG. 9, the steering gear system 80 includes a shaft 94. As shown in FIG. 10, a magnet 96 may be mounted on the shaft 94, such magnet 96 being positioned in proximity to a waveguide 97, such as used in an Auto SE™ manufactured by MTS Systems, Inc. to measure the distance that the shaft 94 has traveled with respect to a linear position sensor 90 on the steering gear system (or alternatively with respect to a steering angle rotary sensor 70 (FIG. 8)) as they are acted on by the steering column 2, 31. Thus, magnetostrictive sensor 99, made up of the magnet 96 and the waveguide 97 to form the Auto SE™ forms the transducer to measure travel of shaft 94. This travel would be determinable to indicate the displacement of the wheels forced by movement of shaft 94.

All of the features of a particular preferred embodiment of the waveguide assembly are not shown in the above disclosure in order to emphasize the generality of the disclosure.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed is:

1. A steering angle sensing system for measuring the angle position of a vehicle steering wheel, controlling the position of vehicle wheels, comprising;

a. a position magnet (7, 8; G1, G2, G3) coupled to the steering wheel (2') rotary movement and a measuring device (4, 9; 28) having a magnetostrictive waveguide stationary referred to the rotary movement of position magnet (7, 8; G1, G2, G3) which is intended for measuring transducer signals, whereby the measuring device (4, 9; 28) and the position magnet (7, 8; G1, G2, G3) are arranged with respect to each other so that the position magnet signals detected by the measuring device (4, 9; 28) indicate the relative position between steering wheel (2') and measuring device (4, 9; 28);

b. said position magnet (7, 8; G1, G2, G3) and magnetostrictive waveguide (9; 28) being coupled as a transducer to the steering wheel (2') rotary movement by said magnetostrictive waveguide (9; 28) extending over a defined arc path traversed by said position magnet (7, 8; G1, G2, G3); and a mode converter (10; 35) fitted at one end of the magnetostrictive waveguide (9; 28) to detect the coupling location;

c. characterized by at least one detector (70; 90) detecting the relative angle of the vehicle wheels.

2. A steering angle sensing system according to claim 1, characterized by said detector (70, 90) determining whether the steering wheel (2') has traveled through an arc greater than 360°.

3. A steering angle sensing system according to claim 2, characterized by said detector (70) measuring angular movement.

4. A steering angle sensing system according to claim 2, characterized by said detector (90) measuring linear movement.

5. A steering angle sensing system according to one of claims 1 to 4, characterized by said detector (70) having gross resolution and the transducer having fine resolution.

6. A rotary position sensor for measuring the position of a rotary device attached to a mechanism movable responsive to the rotary device, comprising:
   a. a magnetostrictive linear sensing element aligned in an at least partially circular arrangement about the device;
   b. a rotatable member rotatable relative to said element;
   c. at least two position magnets for indicating the rotational angle, said position magnets attached to said rotatable member and juxtaposed to said element;
   d. said position magnets arranged in an asymmetrical way about the rotatable member; and
   e. a sensing element coupled to the mechanism for detecting rotations greater than 360° or less of the rotary device.

7. The rotary position sensor of claim 6, wherein said sensing element measures angular rotation of the rotary device.

8. The rotary position sensor of claim 6 or 7, wherein said sensing element measures the position of the mechanism.

9. The rotary position sensor of claim 6 or 7, wherein said sensing element measures the angular movement of the mechanism.

10. The rotary position sensor of claim 6 wherein said sensing element measures the 360° or less rotation at a low resolution.

11. The rotary position sensor of claim 6 or 7, wherein said sensing element measures the linear movement of the mechanism.

12. The rotary position sensor of claim 11, wherein said linear sensing element measures angles at or below 360° or less in rotation at a high resolution.

13. A steering angle sensing system for measuring the angle position of a vehicle steering wheel, controlling the position of vehicle wheels, comprising;
   a. a high resolution position locator (7, 8; G1, G2, G3) coupled to the steering wheel (2') rotary movement and a measuring device (4, 9; 28) stationary referred to the rotary movement of locator (7, 8; G1, G2, G3) which is intended for measuring transducer signals, whereby the measuring device (4, 9; 28) and the locator (7, 8; G1, G2, G3) are arranged with respect to each other so that the locator signals detected by the measuring device (4, 9; 28) indicate the relative position between steering wheel (2') and measuring device (4, 9; 28);
   b. the locator (7, 8; G1, G2, G3) and measuring device (9; 28) being coupled as a transducer to the steering wheel (2') rotary movement by said measuring device (90; 28) extending over a defined arc path traversed by said locator (7, 8; G1, G2, G3); and a detector (10; 35) fitted at one end of the measuring device (9; 28) to detect the coupling location;
   c. characterized by at least one detector (70; 90) at the steering gear detecting the relative angle of the vehicle wheels.

* * * * *